(12) United States Patent
Tawa et al.

(10) Patent No.: US 7,118,433 B2
(45) Date of Patent: Oct. 10, 2006

(54) OUTBOARD MOTOR AIR INTAKE SYSTEM

(75) Inventors: Hiroki Tawa, Saitama (JP); Mitsuhara Tanaka, Saitama (JP); Hideaki Takada, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/157,597

(22) Filed: Jun. 21, 2005

(65) Prior Publication Data

US 2005/0287887 A1 Dec. 29, 2005

(30) Foreign Application Priority Data

Jun. 24, 2004 (JP) ............................. 2004-186873

(51) Int. Cl.
*B60W 10/04* (2006.01)
(52) U.S. Cl. ....................................................... 440/84
(58) Field of Classification Search ................... 440/84
See application file for complete search history.

(56) References Cited

U.S. PATENT DOCUMENTS 2,581,334 A * 1/1952 Reggio ........................ 123/378
3,142,957 A * 8/1964 Roesling ..................... 60/605.1
5,554,322 A * 9/1996 Kobayashi ................... 261/35
5,911,211 A * 6/1999 Uchida ....................... 123/559.1
6,405,692 B1 * 6/2002 Christiansen ............ 123/65 BA

FOREIGN PATENT DOCUMENTS

| JP | 10-184402 | 7/1998 |
| JP | 2817738 | 8/1998 |

* cited by examiner

*Primary Examiner*—Stephen Avila
(74) *Attorney, Agent, or Firm*—Carrier, Blackman & Associates, P.C.; Joseph P. Carrier; William D. Blackman

(57) ABSTRACT

In an outboard motor air intake system, there are equipped with a secondary air passage connected to an air intake pipe at a location downstream of the throttle valve in terms of intake air flow; a manual valve installed in the secondary air passage to be operable by the operator to regulate a sectional area of the secondary air passage, a knob positioned at a location remote from the outboard motor to be operable by the operator, and a wire connecting the knob to the manual valve, such that the sectional area of the secondary air passage can be regulated through the knob and the manual valve at the location remote from the outboard motor, thereby making it easy to realize fine regulation when the engine operates in a low-speed such as idling.

4 Claims, 9 Drawing Sheets

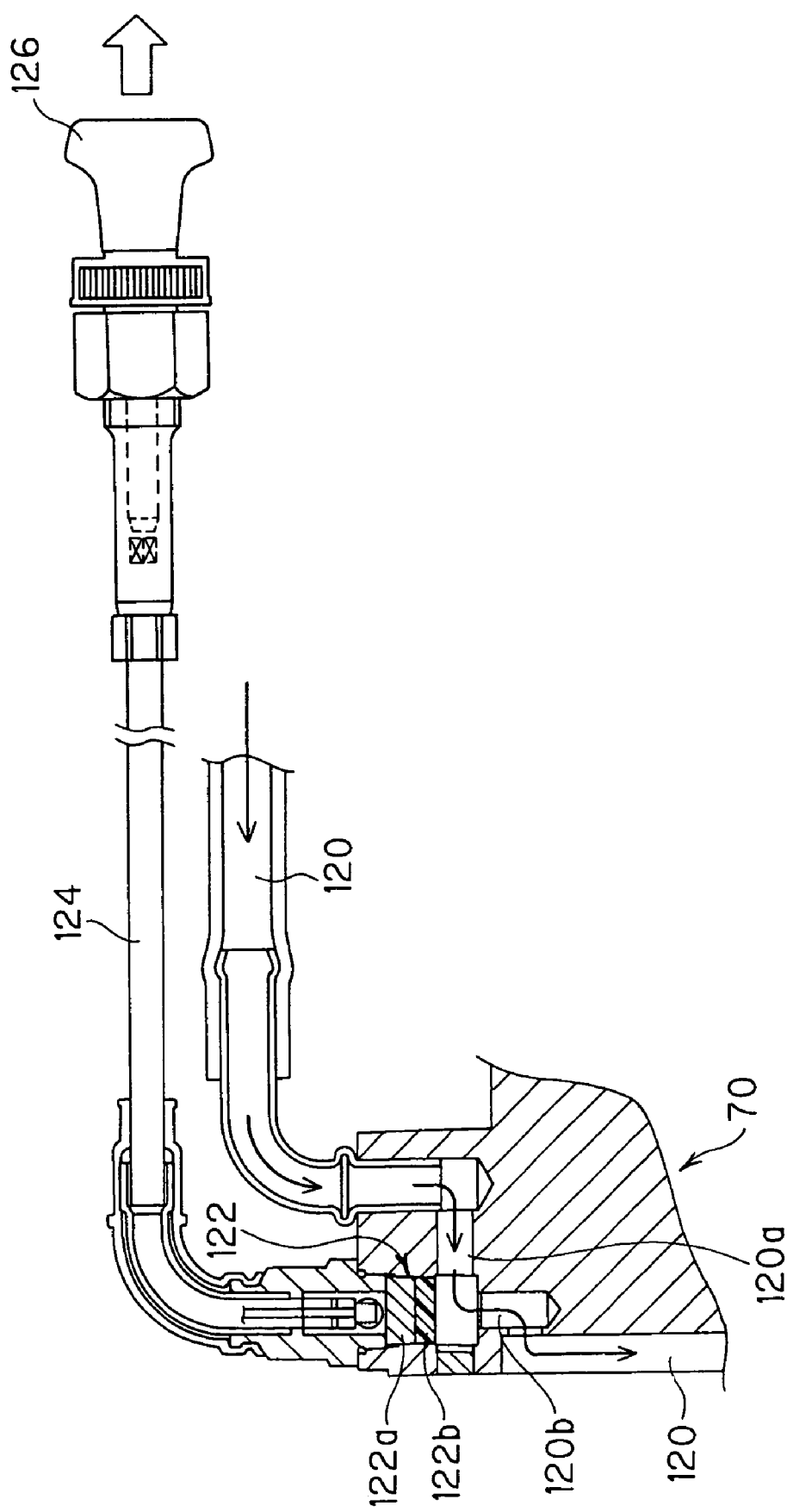

OUTBOARD MOTOR AIR INTAKE SYSTEM

BACKGROUND OF THE INVENTION

1. Field of the Invention

This invention relates to an outboard motor air intake system.

2. Description of the Related Art

Outboard motor air intake systems have recently been proposed that use an actuator to open and close the throttle valve of the internal combustion engine incorporated in the outboard motor. Generally in a system of this type, the operator inputs an instruction to open the throttle valve by manipulating a remote control lever installed outside the outboard motor (at an appropriate location on the hull of the boat driven by the outboard motor) and the throttle opening is regulated accordingly by controlling the operation of the actuator, as taught, for example, in Japanese Patent No. 2817738, paragraphs 0013 to 0017 and FIG. 1.

However, the prior art system does not take into account an important aspect of the relationship between the throttle opening and the amount of air drawn in.

Namely, it ignores the fact that the change in amount of intake air with respect to change in throttle opening increases with decreasing throttle valve opening. This relationship arises because the pressure difference between upstream and downstream of the throttle valve increases with decreasing throttle opening. Therefore, owing to the limited resolution power of the sensor that detects the amount of remote control lever manipulation, the operator's weak sense of manipulation because of the mechanical isolation of the remote control lever from the throttle valve and various other factors, the prior art system that opens and closes the throttle valve by operating an actuator in response to the manipulation of the remote control lever makes it difficult during small throttle valve opening (including the full-closed condition) to finely regulate the amount of intake air, i.e., to finely regulate engine speed when the engine is operating in a low-speed region including the idling region.

SUMMARY OF THE INVENTION

An object of this invention is therefore to overcome this drawback by providing an outboard motor air intake system that, while permitting regulation of throttle opening by an actuator, enables fine regulation of the amount of intake air during small throttle valve opening, fine regulation of which has heretofore been difficult to achieve, to be readily achieved, thereby making it easy to realize fine regulation when the engine operates in a low-speed region including the idling region.

In order to achieve the object, this invention provides an air intake system of an internal combustion engine mounted on an outboard motor, comprising: a throttle valve installed in an air intake pipe of the engine; an actuator connected to the throttle valve to move the throttle valve; a control unit controlling operation of the actuator in response to an instruction of an operator to open/close the throttle valve to regulate amount of intake air to be supplied to the engine; a secondary air passage connected to the air intake pipe at a location downstream of the throttle valve in terms of intake air flow; and a manual valve installed in the secondary air passage to be operable by the operator to regulate a sectional area of the secondary air passage.

BRIEF DESCRIPTION OF THE DRAWINGS

The above and other objects and advantages of the invention will be more apparent from the following description and drawings in which:

FIG. 9 is a sectional view taken along line IX—IX in FIG. 8.

DETAILED DESCRIPTION OF THE PREFERRED EMBODIMENT

An outboard motor air intake system according to a preferred embodiment of the present invention will now be explained with reference to the attached drawings.

Figure 1:
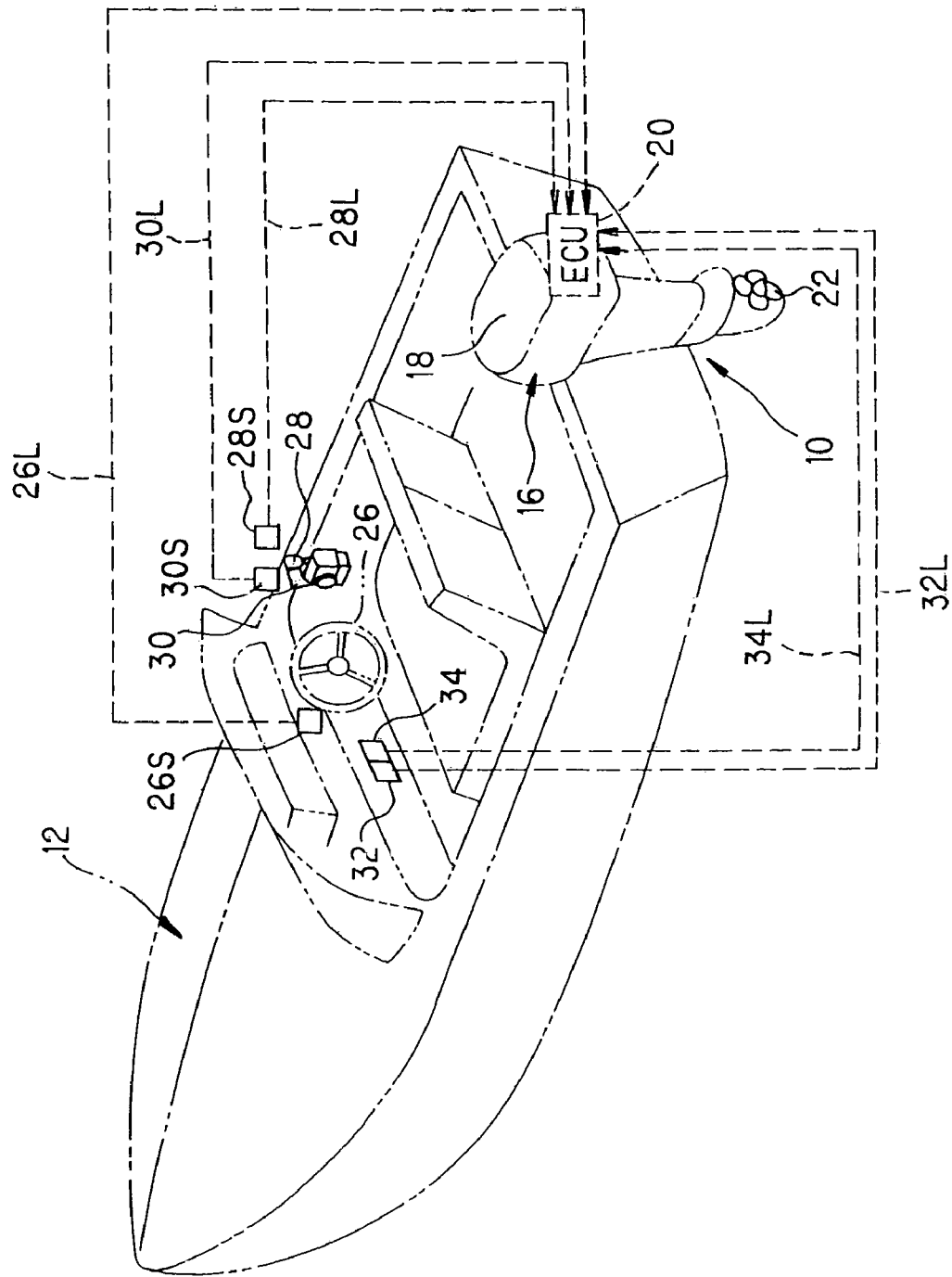
FIG. 1 is an overall schematic view of an outboard motor air intake system according to an embodiment of the invention, with primary focus on the outboard motor.
Figure 2:
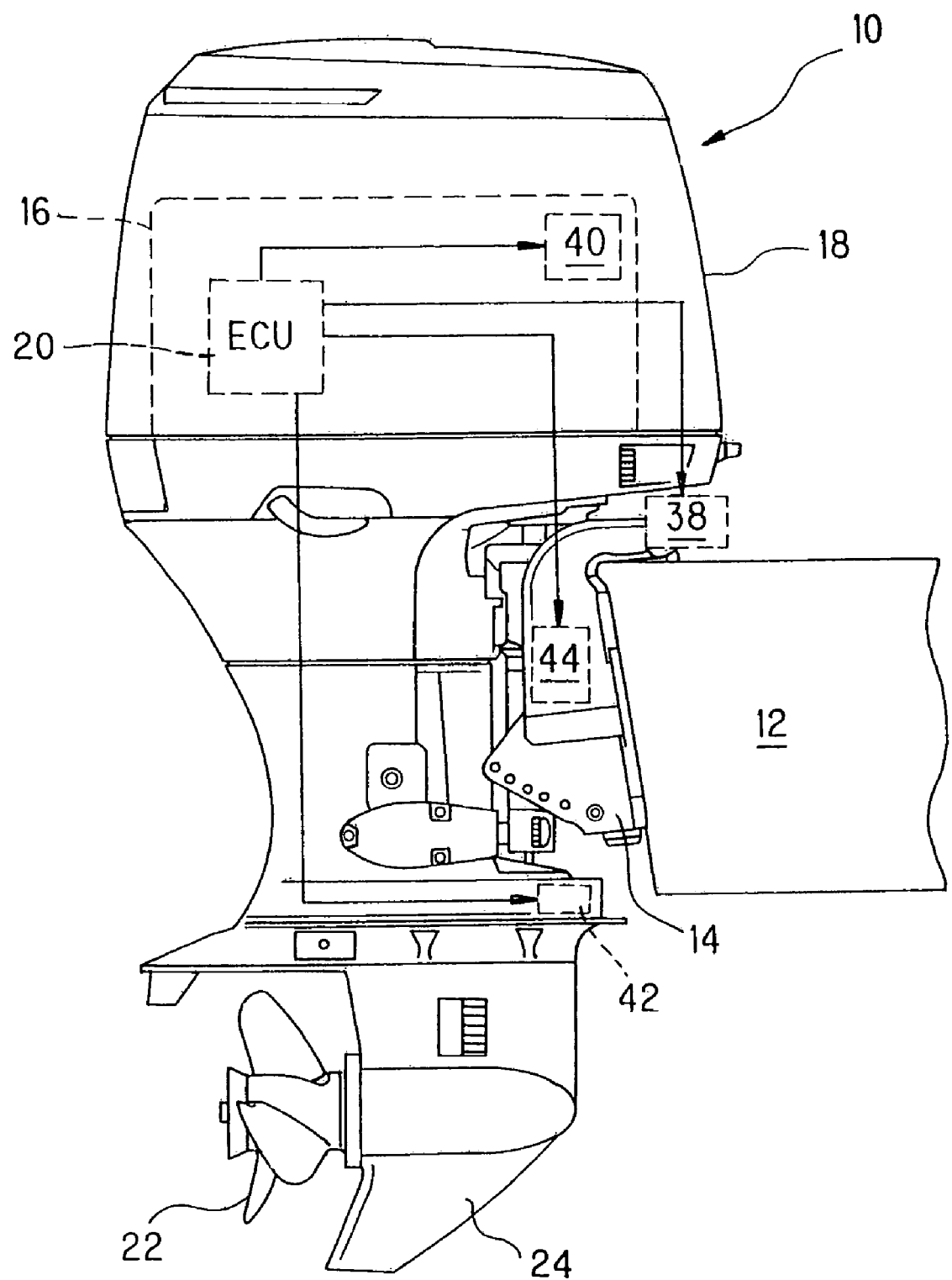
FIG. 2 is an explanatory partial side view of the system shown in FIG. 1.

FIG. 1 is an overall schematic view of an outboard motor air intake system according to an embodiment of the invention, with primary focus on the outboard motor, and FIG. 2 is an explanatory partial side view of the system.

Reference numeral 10 in FIGS. 1 and 2 designates an outboard motor. The outboard motor 10 is mounted on the stern of a hull (boat) 12 through stem brackets 14 (shown in FIG. 2).

As shown in FIG. 2, the outboard motor 10 is equipped with an internal combustion engine (hereinafter referred to simply as "engine") 16 at its upper portion. The engine 16 is a spark-ignition, V-type, six-cylinder gasoline engine. The engine 16 is disposed in the outboard motor 10 with enclosed by an engine cover 18 and positioned above the water surface. An electronic control unit (herein after referred to as "ECU") 20 comprising a microcomputer is installed near the engine 16 enclosed by the engine cover 18.

The outboard motor 10 is equipped at its lower part with a propeller 22 and a rudder 24. The propeller 22 is powered by the engine 16 and rotates so as to propel the boat 12 in the forward and reverse directions.

As shown in FIG. 1, a steering wheel 26 is installed near the operator's seat of the boat 12. A steering angle sensor 26S is installed near the steering wheel 26 and generates or outputs a signal in response to the steering angle (control input) of the steering wheel 26 inputted by the operator. A throttle lever (remote control lever) 28 is installed on the right side of the operator's seat. A throttle lever position sensor 28S is installed near the throttle lever 28 and generates or outputs a signal in response to the position of the throttle lever 28 operated by the operator.

A shift lever (remote control lever) 30 is also installed near the throttle lever 28. A shift lever position sensor 30S is installed near the shift lever 30 and generates or outputs a signal in response to the position of the shift lever 30 operated by the operator.

A power tilt switch 32 for regulating the tilt angle of the outboard motor 10 and a power trim switch 34 for regulating the trim angle of the outboard motor 10 are further installed near the operator's seat and output signals in response to the instructions of tilt up/down or trim up/down inputted by the operator. The outputs of the steering angle sensor 26S, throttle lever position sensor 28S, shift lever position sensor 30S, power tilt switch 32 and power trim switch 34 are sent to the ECU 20 over signal lines 26L, 28L, 30L, 32L and 34L.

Based on the outputted values sent from the steering angle sensor 26S via the signal line 26L, the ECU 20 controls the operation of an electric steering motor 38 (shown in FIG. 2) to steer the outboard motor 10 to the right and left directions.

Based on the output values sent from the throttle lever position sensor 28S via the signal line 28L, the ECU 20 also controls the operation of a throttle drive motor (electric motor) 40 to move a throttle valve (not shown in FIGS. 1 and 2). Thus, ECU 20 regulates the amount of intake air to be supplied to the engine 16, thereby regulating the engine speed of the engine 16.

ECU 20 also controls the operation of an electric shift motor 42, based on the output values sent from the shift lever position sensor 30S via the signal line 30L, to select the direction of the rotation of the propeller 22 or cut off the power transmission to the propeller 22.

ECU 20 further controls the operation of a conventional power tilt-trim unit 44, based on the output values sent from the power tilt switch 32 and the power trim switch 34 via the signal lines 32L and 34L, to regulate the tilt/trim angles of the outboard motor 10.

Figure 3:
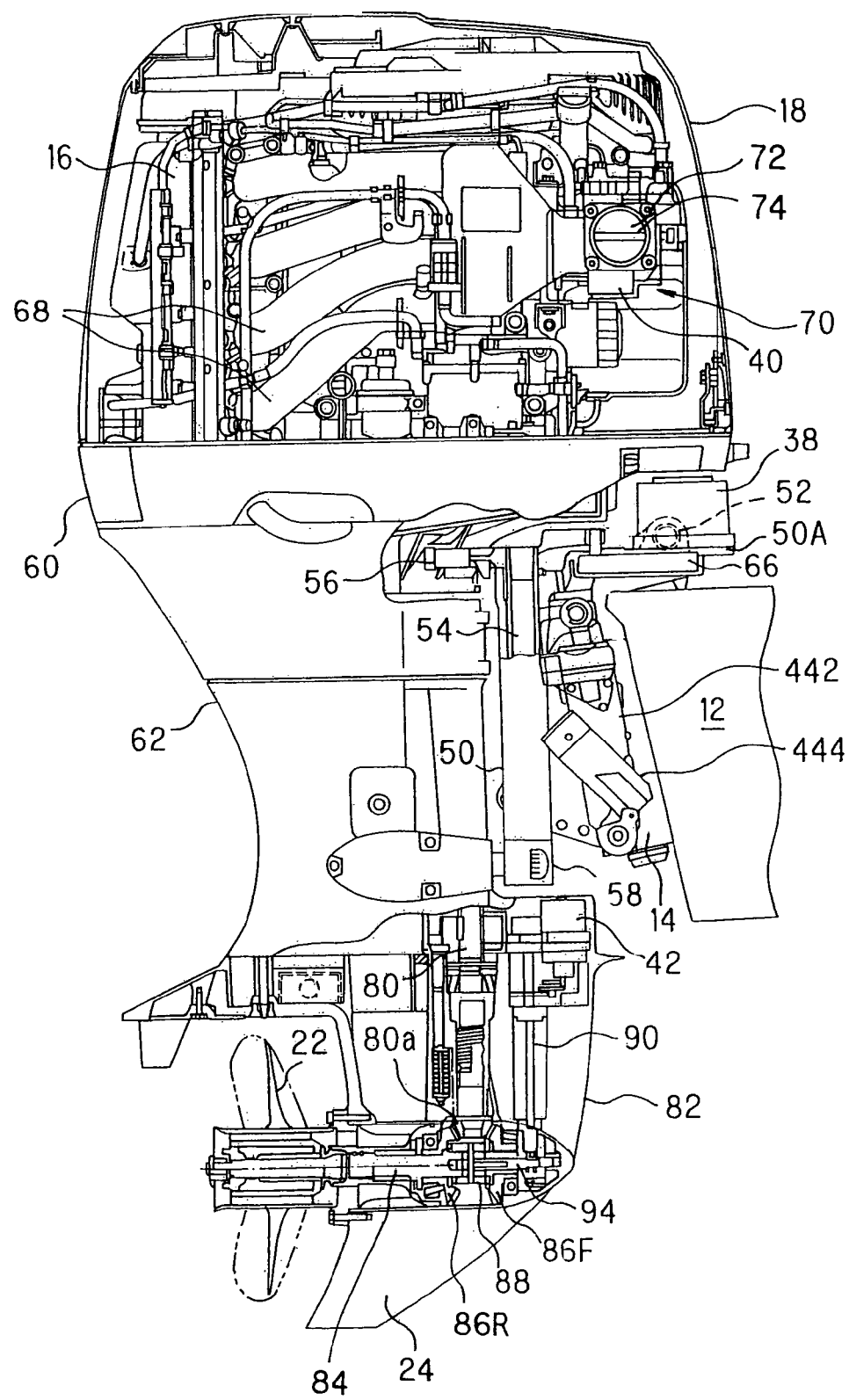
FIG. 3 is an enlarged view, partially in section, of the vicinity of a swivel case shown in FIG. 2.

FIG. 3 is an enlarged explanatory side view giving an enlarged view of FIG. 2. In the figure, it shows with the stem brackets 14 on the right side in the forward direction (on the boat side) removed and with the view partly cross-sectioned or perspective.

As shown in FIG. 3, the power tilt-trim unit 44 integrally comprises one hydraulic cylinder for tilt angle regulation (hereinafter called "tilt hydraulic cylinder") 442 and two hydraulic cylinders for trim angle regulation (only one shown; hereinafter called "trim hydraulic cylinders") 444.

The cylinder bottom of the tilt hydraulic cylinder 442 is fastened to the stem brackets 14 and a piston rod thereof abuts on the swivel case 50. The cylinder bottom of each trim hydraulic cylinder 444 is fastened to the stem brackets 14 and a piston rod thereof abuts on the swivel case 50.

The swivel case 50 is connected to the stern brackets 14 through a tilting shaft 52 such that it can relatively displace around the tilting shaft 52. A swivel shaft 54 is rotatably housed in the swivel case 50. The upper end of the swivel shaft 54 is fastened to a mount frame 56 and the lower end thereof is fastened to a lower mount center housing 58. The mount frame 56 and lower mount center housing 58 are fastened to an undercover 60 and extension case 62 (specifically to a mount covered by them).

The electric steering motor 38 and a gear box 66 that reduces the output speed of the electric steering motor 38 are fastened to the upper portion 50A of the swivel case 50. The gear box 66 is connected at its input side to an output shaft of the electric steering motor 38 and at its output side to the mount frame 56.

The upper portion of the undercover 60 is equipped with the engine 16 and the engine cover 18 covering the engine 16, as shown in the figure. The engine 16 is connected via an intake manifold 68 and air intake pipe to a throttle body 70.

The throttle drive motor 40 is integrally attached to the throttle body 70. The throttle drive motor 40 thus integrally attached to the throttle body 70 is connected to a throttle shaft 74 supporting the throttle valve (now assigned with reference numeral 72) via a speed reduction gear mechanism (not shown in FIG. 3) integrally attached to the throttle body 70 in the same manner.

The output of the engine 16 is transmitted, via a crankshaft (not shown) and a drive shaft 80, to a propeller shaft 84 housed in a gear case 82, and rotates the propeller 22. The gear case 82 is formed integrally with the rudder 24.

A forward gear 86F and a reverse gear 86R are installed around the propeller shaft 84 to mesh with a drive gear 80a and be rotated in opposite directions. A clutch 88 that rotates integrally with the propeller shaft 84 is provided between the forward gear 86F and reverse gear 86R. When the electric shift motor 42 is driven, it operates a shift rod 90 and shift slider 94 so as to mesh the clutch 88 with either the forward gear 86F or the reverse gear 86R, thereby selecting the direction of rotation of the propeller 22, i.e., shifting between forward and reverse.

The engine 16 will now be explained with reference to FIG. 4.

Figure 4:
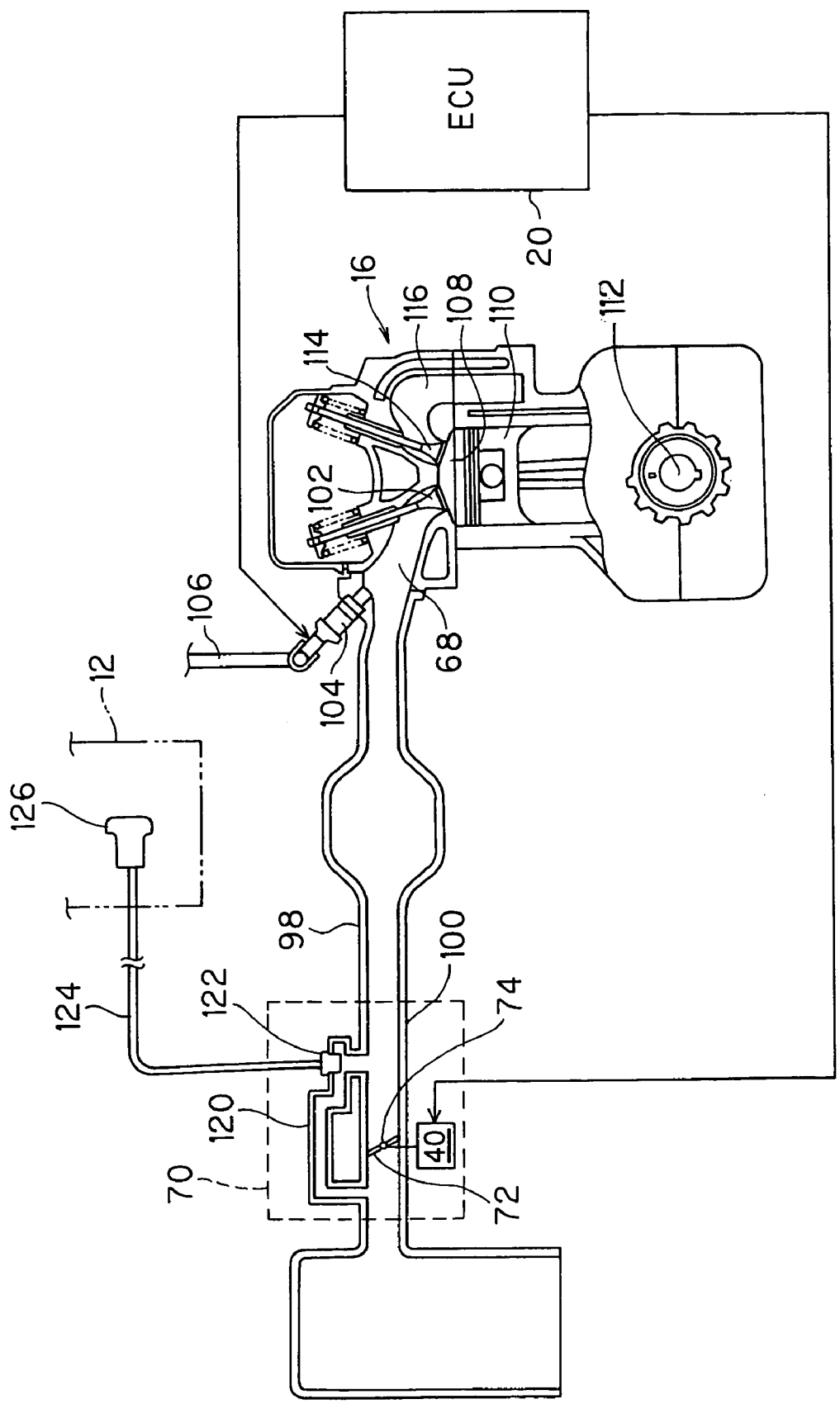
FIG. 4 is a schematic view of an engine shown in FIG. 2.

As shown in FIG. 4, the engine 16 is equipped with an air intake pipe 98. A throttle body 70 is installed in the air intake pipe 98. Intake air drawn into the air intake pipe 98 is regulated in flow rate by the throttle valve 72 installed in the air intake pipe (now assigned with reference numeral 100) inside the throttle body 70, whereafter it flows through the intake manifold 68 to intake valves 102. A fuel injector 104 installed near the intake valves 102 injects gasoline fuel in an amount corresponding to the amount of intake air.

The injector 104 is connected through a fuel supply pipe 106 to a fuel tank (not shown) for holding gasoline fuel. A fuel pump (not shown) is installed in the fuel supply pipe 106 for feeding pressurized gasoline fuel to the injector 104.

The intake air mixes with the injected gasoline fuel to produce an air-fuel mixture that is drawn into combustion chambers 108 of the individual cylinders. The air-fuel mixture drawn into each combustion chamber 108 is ignited by a spark plug (not shown) to burn explosively and drive down a piston 110. The so-produced engine output is taken out through the crankshaft (now assigned with reference numeral 112). The exhaust gas produced by the combustion exits through an exhaust valve 114 and passes through an exhaust manifold 116 to be discharged outside the engine 16.

The throttle body 70 has a secondary air passage 120 that is connected to the air intake pipe 100 at a location downstream of the throttle valve 72 in terms of intake air flow. More specifically, the secondary air passage 120 is a bypass air passage communicating the upstream and downstream sides of the throttle valve 72.

The secondary air passage 120 is installed with a manual valve 122. The manual valve 122 regulates, when manipulated, the opening area of the secondary air passage 120 to regulate the amount of intake air supplied to the engine 16 through the secondary air passage 120. An operating knob 126 is connected to the manual valve 122 through a wire (more specifically, push-pull cable) 124. The operating knob 126 is positioned at or mounted on the boat 12 at an appropriate location remote from the outboard motor 10 where the operator can conveniently manipulate it to open and close the manual valve 122.

Figure 5:
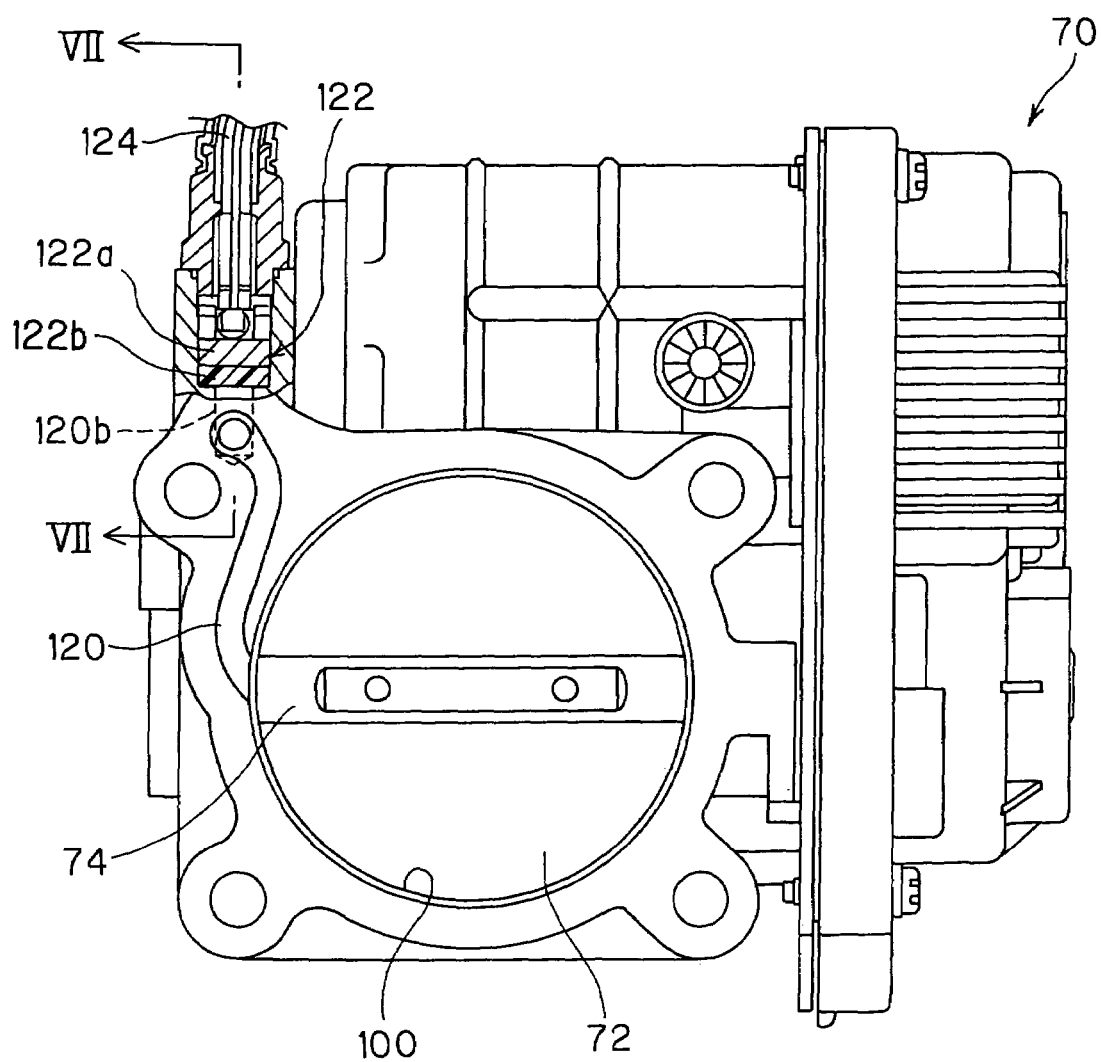
FIG. 5 is a partially sectional view of a throttle body shown in FIG. 3.

FIG. 5 is a partially sectional view of the throttle body 70, more specifically a partial sectional view from the downstream side of the air intake pipe 98.

The throttle body 70 will now be explained in detail with reference to FIGS. 5 to 9.

As shown in FIG. 5, the throttle valve 72 is installed in the air intake pipe 100 formed in the throttle body 70. The throttle valve 72 is rotatably supported by the throttle shaft 74.

Figure 6:
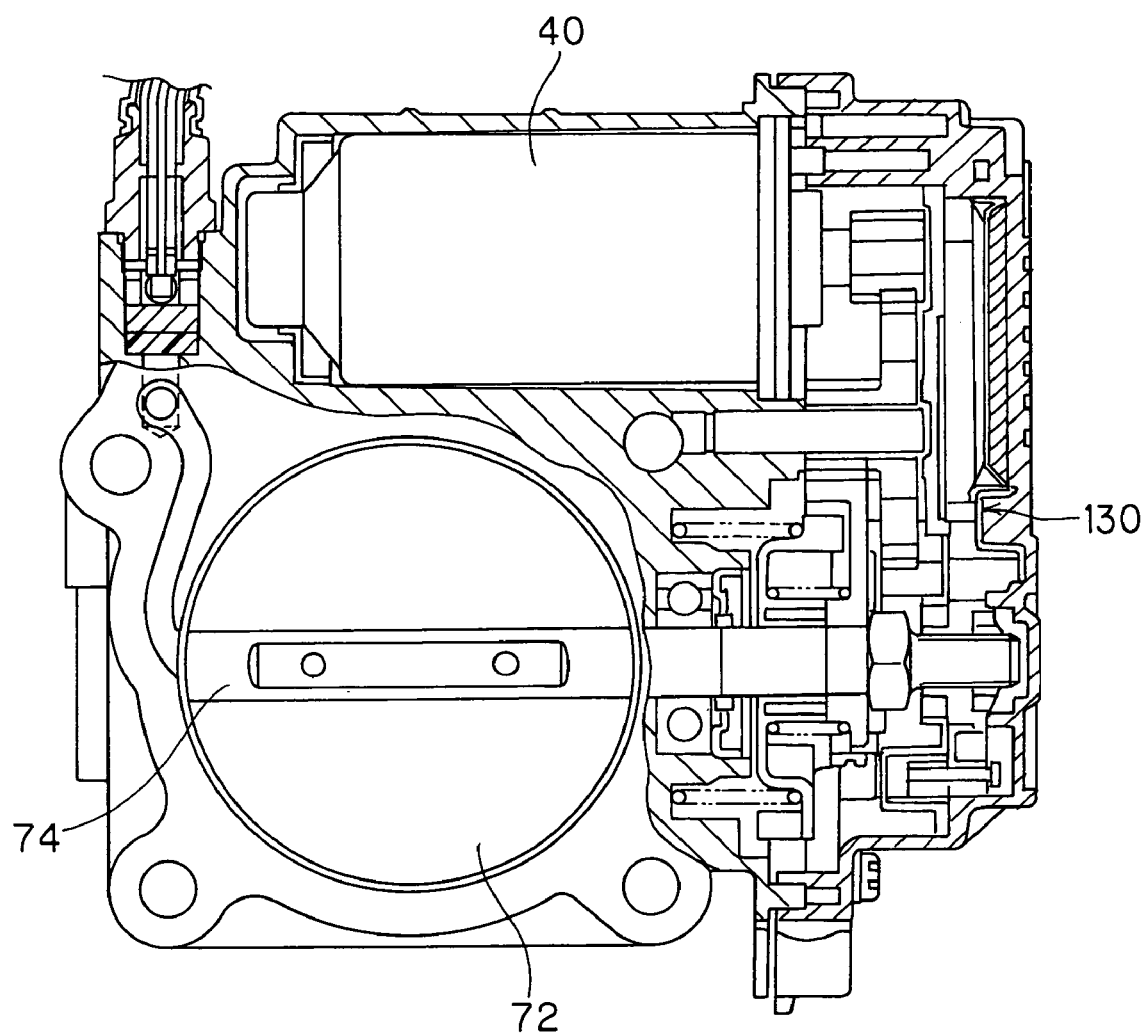
FIG. 6 is a partially sectional view of the throttle body similar to FIG. 5.

FIG. 6 is a partially sectional view of the throttle body 70 whose portion shown in section is larger than that in FIG. 5. As shown in FIG. 6, a speed reduction gear mechanism 130 and the throttle drive motor 40 are accommodated in the throttle body 70 integrally therewith.

The speed reduction gear mechanism 130, which is made up of multiple spur gears, is connected to the throttle drive motor 40 on the input side and to throttle shaft 74 on the output side. The rotational output of the throttle drive motor 40 is therefore reduced and applied to the throttle shaft 74 to open/close the throttle valve 72.

The explanation of FIG. 5 will be resumed. The throttle body 70 is further integrally equipped with the secondary air passage 120.

Figure 7:
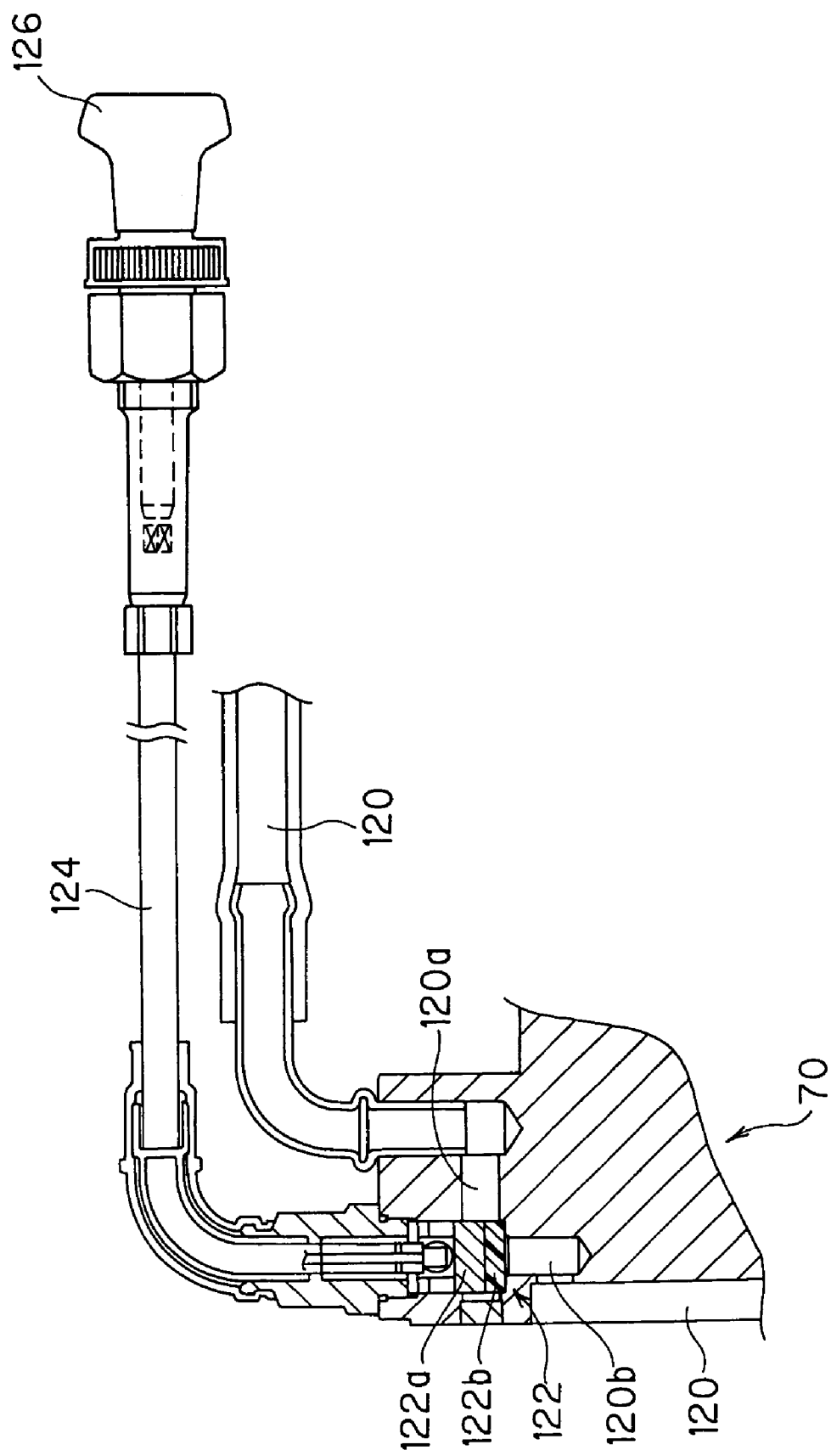
FIG. 7 is a sectional view taken along line VII—VII in FIG. 5.

FIG. 7 is a sectional view taken along line VII—VII in FIG. 5.

As shown in FIGS. 5 and 7, the manual valve 122 is installed in the secondary air passage 120 for regulating the opening or sectional area thereof. As illustrated, the secondary air passage 120 is configured to include the secondary air passage 120 in a region where an upstream side conduit (designated 120a) and a downstream side conduit (designated 120b) meet at right angles.

The manual valve 122 comprises a valve body 122a and a seal rubber 122b attached to one face thereof. When the manual valve 122 is closed, the seal rubber 122b abuts on the open end (most upstream side) of the conduit 120b to seal the open end. One end of the wire 124 is connected to the valve body 122a at the face opposite from the one having the seal rubber 122b and the other end of the wire 124 is attached to the operating knob 126.

Figure 8:
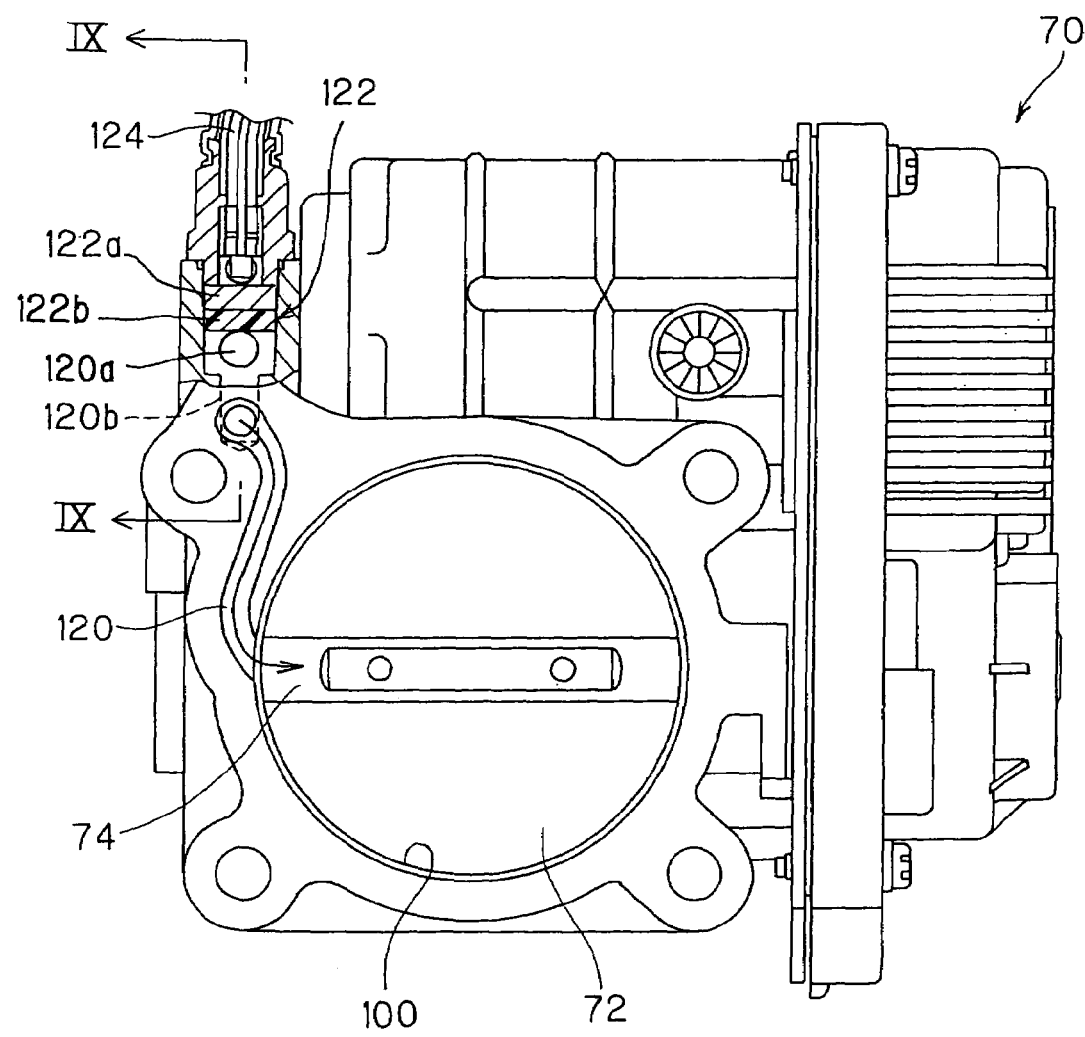
FIG. 8 is a partially sectional view of the throttle body similar to FIG. 5.

FIG. 8 is a partially sectional view of the throttle body similar to FIG. 5. FIG. 9 is a sectional view taken along line IX—IX in FIG. 8.

As can be seen from in FIGS. 8 and 9, a pulling force applied to the operating knob 126 operates through the wire 124 to open the manual valve 122 and allow intake air to pass through the secondary air passage 120. The intake air passing through the secondary air passage 120 flows into the air intake pipe 100 downstream of the throttle valve 72 to be supplied to the engine 16. On the other hand, a pushing force applied to the operating knob 126 closes the manual valve 122 as shown in FIGS. 5 and 7 discussed earlier, thereby stopping the supply of intake air to the engine 16 that was being conducted through the secondary air passage 120.

The sectional area of the secondary air passage 120, i.e., the flow rate or amount of the intake air, is made considerably smaller than that of the air intake pipes 98, 100. Therefore, by manipulating the operating knob 126 to regulate the opening of the manual valve 122, the amount of intake air supplied to the engine 16 can be finely adjusted irrespective of the opening of the throttle valve 72. In other words, even when the engine 16 operates in a low-speed region including the idling region (i.e., even when the throttle opening is small (including the full-closed condition)), the speed of the engine 16 can be finely regulated by manipulating the operating knob 126 to regulate the opening of the manual valve 122.

The embodiment is thus configured to have an air intake system of an internal combustion engine (16) mounted on an outboard motor (10), comprising: a throttle valve (72) installed in an air intake pipe (100) of the engine; an actuator (throttle drive motor 40) connected to the throttle valve to move the throttle valve; a control unit (ECU 20) controlling operation of the actuator in response to an instruction of an operator to open/close the throttle valve to regulate amount of intake air to be supplied to the engine; a secondary air passage (120) connected to the air intake pipe at a location downstream of the throttle valve in terms of intake air flow; and a manual valve (122) installed in the secondary air passage to be operable by the operator to regulate a sectional area of the secondary air passage. This enables fine regulation of the amount of intake air during small throttle valve opening, fine regulation of which has heretofore been difficult to achieve, to be readily achieved, thereby making it easy to realize fine regulation when the engine 16 operates in a low-speed region including the idling region.

The system further includes: a knob (operating knob 126) positioned at a location remote from the outboard motor to be operable by the operator; and a connector (wire 124) connecting the knob to the manual valve, such that the sectional area of the secondary air passage can be regulated through the knob 126 and the manual valve 122 at the location remote from the outboard motor. With this, by manipulating the knob 126 to regulate the opening of the manual valve 122, the amount of intake air to be supplied to the engine 16 can be finely adjusted irrespective of the opening of the throttle valve 72 and at any location remote from the outboard motor 10.

Although it is configured such that the upstream side of the secondary air passage 120 is communicating with the air intake pipe 100, it may be open to the atmospheric air. Further, the manual valve 122 may be a butterfly type or needle type.

Although it is configured such that the operating knob 126 is disposed on the boat 12 at an appropriate location remote from the outboard motor 10, it may be attached to the outboard motor 10. In addition, a detent can be installed in the operating knob 126 so as to hold the opening of the manual valve 122 at multiple levels.

In the air intake system, the knob is positioned on the boat 12 and the connector is a wire (124).

Japanese Patent Application No. Ser. 2004-186873 filed on Jun. 24, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An air intake system of an internal combustion engine mounted on an outboard motor, comprising:

a throttle valve installed in an air intake pipe of the engine;

an actuator connected to the throttle valve to move the throttle valve;

a control unit controlling operation of the actuator in response to an instruction of an operator to open/close the throttle valve to regulate amount of intake air to be supplied to the engine;

a secondary air passage connected to the air intake pipe at a location downstream of the throttle valve in terms of intake air flow; and a manual valve installed in the secondary air passage to be operable by the operator to regulate a sectional area of the secondary air passage.

2. The air intake system according to claim 1, further including:
- a knob positioned at a location remote from the outboard motor to be operable by the operator; and
- a connector connecting the knob to the manual valve, such that the sectional area of the secondary air passage can be regulated through the knob and the manual valve at the location remote from the outboard motor.

3. The air intake system according to claim 2, wherein the knob is positioned on the boat.

4. The air intake system according to claim 2, wherein the connector is a wire.

* * * * *